US012698638B2

(12) United States Patent
Booth et al.

(10) Patent No.: US 12,698,638 B2
(45) Date of Patent: Aug. 4, 2026

(54) SYSTEM AND METHOD TO MONITOR AND CONTROL POOL EQUIPMENT

(71) Applicant: SmartPoolSaver Inc., Toronto (CA)

(72) Inventors: Kyle Booth, Toronto (CA); Dinesh Bulathsinghala, Toronto (CA)

(73) Assignee: SmartPoolSaver Inc., Toronto (CA)

( * ) Notice: Subject to any disclaimer, the term of this patent is extended or adjusted under 35 U.S.C. 154(b) by 645 days.

(21) Appl. No.: 17/985,497

(22) Filed: Nov. 11, 2022

(65) Prior Publication Data

US 2023/0145631 A1     May 11, 2023

Related U.S. Application Data

(60) Provisional application No. 63/278,387, filed on Nov. 11, 2021.

(51) Int. Cl.
| | |
|---|---|
| *E04H 4/12* | (2006.01) |
| *G06F 13/42* | (2006.01) |
| *H02J 3/17* | (2026.01) |

(52) U.S. Cl.
CPC ....... *E04H 4/1245* (2013.01); *G06F 13/4247* (2013.01); *H02J 3/17* (2026.01)

(58) Field of Classification Search
CPC .................................................. G06F 13/4282
USPC ......................................................... 710/110
See application file for complete search history.

(56) References Cited

U.S. PATENT DOCUMENTS

| | | | |
|---|---|---|---|
| 3,607,103 | A | 9/1971 | Kiefer |
| 4,685,158 | A | 8/1987 | Lively |

| | | | |
|---|---|---|---|
| 5,117,233 | A | 5/1992 | Hamos et al. |
| 5,422,014 | A | 6/1995 | Allen et al. |
| 5,730,861 | A | 3/1998 | Sterghos et al. |
| 6,409,926 | B1 | 6/2002 | Martin |
| 6,676,831 | B2 | 1/2004 | Wolfe |
| 7,291,261 | B1 | 11/2007 | Rhodes |
| 9,034,193 | B2 | 5/2015 | Shalon |
| 9,776,888 | B1 | 10/2017 | Kurani et al. |
| 10,037,675 | B2 | 7/2018 | Uy |

(Continued)

FOREIGN PATENT DOCUMENTS

| | | |
|---|---|---|
| AU | 2009315505 B2 | 12/2012 |
| AU | 2017388639 A1 | 8/2019 |

(Continued)

*Primary Examiner* — Brian T Misiura

(74) *Attorney, Agent, or Firm* — Own Innovation Inc.; James W. Hinton; Osman Ismaili

(57) ABSTRACT

A multi-node remote pool monitoring system and method is provided. The system includes a master control unit and at least one slave node connected to a piece of pool equipment and serially connected to at least one other slave node in a daisy-chain configuration for transmitting power and data between the nodes. Each node may further be connected to a sensor for monitoring the output of the pool equipment connected to that node. Each relay node has a unique network address by which the master node can address and command or query each slave node to switch a connected relay/load; report the status of the connected load; and report the signal recorded by connected sensors. The data transmitted along the multi-node network and a pool signature may be processed for predicting pool equipment runtime energy demand, one or more operational states of pool equipment and equipment failure.

11 Claims, 12 Drawing Sheets

(56)                References Cited

U.S. PATENT DOCUMENTS

| | | | |
|---|---|---|---|
| 10,062,259 B2 | 8/2018 | Sentosa et al. | |
| 10,150,680 B1 | 12/2018 | Kurani et al. | |
| 10,287,180 B1 | 5/2019 | Kurani et al. | |
| 10,329,177 B2 | 6/2019 | Greenwood et al. | |
| 11,525,594 B1 * | 12/2022 | Hinson | F24F 11/64 |
| 12,149,075 B1 * | 11/2024 | Li | H02J 3/004 |
| 2010/0059423 A1 | 3/2010 | Davis et al. | |
| 2014/0027358 A1 | 1/2014 | Sayre et al. | |
| 2014/0277777 A1 | 9/2014 | Potucek | |
| 2014/0303782 A1 * | 10/2014 | Pruchniewski | E04H 4/14 |
| | | | 709/204 |
| 2014/0314062 A1 | 10/2014 | Loebs | |
| 2014/0379160 A1 * | 12/2014 | Fallon | H02J 3/32 |
| | | | 700/297 |
| 2017/0092096 A1 | 3/2017 | Fernandes et al. | |
| 2017/0195164 A1 * | 7/2017 | Kacel | H04L 12/40 |
| 2017/0209339 A1 | 7/2017 | Potucek et al. | |
| 2017/0212530 A1 | 7/2017 | Potucek et al. | |
| 2017/0215261 A1 * | 7/2017 | Potucek | H04L 43/0817 |
| 2017/0361727 A1 * | 12/2017 | Miftakhov | G01R 31/3842 |
| 2018/0130328 A1 | 5/2018 | Fernandes et al. | |
| 2019/0105226 A1 | 4/2019 | Potucek et al. | |
| 2019/0149350 A1 | 5/2019 | Khalid et al. | |
| 2021/0003974 A1 * | 1/2021 | Yang | G06N 3/0455 |
| 2025/0271164 A1 * | 8/2025 | Torres | F24H 15/219 |

FOREIGN PATENT DOCUMENTS

| | | | |
|---|---|---|---|
| AU | 2020239698 A1 | 10/2020 | |
| CA | 2361386 C | 4/2009 | |
| CA | 2705074 A1 | 5/2009 | |
| CA | 2741561 A1 | 5/2010 | |
| CA | 2753067 A1 | 4/2012 | |
| CA | 2842816 A1 | 2/2013 | |
| CA | 2906138 A1 | 9/2014 | |
| CN | 207336505 U | 5/2018 | |
| CN | 207924873 U | 9/2018 | |
| CN | 108663686 A | 10/2018 | |
| CN | 208014138 U | 10/2018 | |
| CN | 109637086 A | 4/2019 | |
| EP | 3053280 B1 | 2/2018 | |
| WO | 2012079027 A2 | 6/2012 | |
| WO | 2012092625 A2 | 7/2012 | |
| WO | 2016176169 A1 | 11/2016 | |

* cited by examiner

300

301
302
303
304
305
306
307
308
309
310
311
312

320

321
322
323
324
325
326
327
328
329

330

331
333
335
337

332
334
336
338

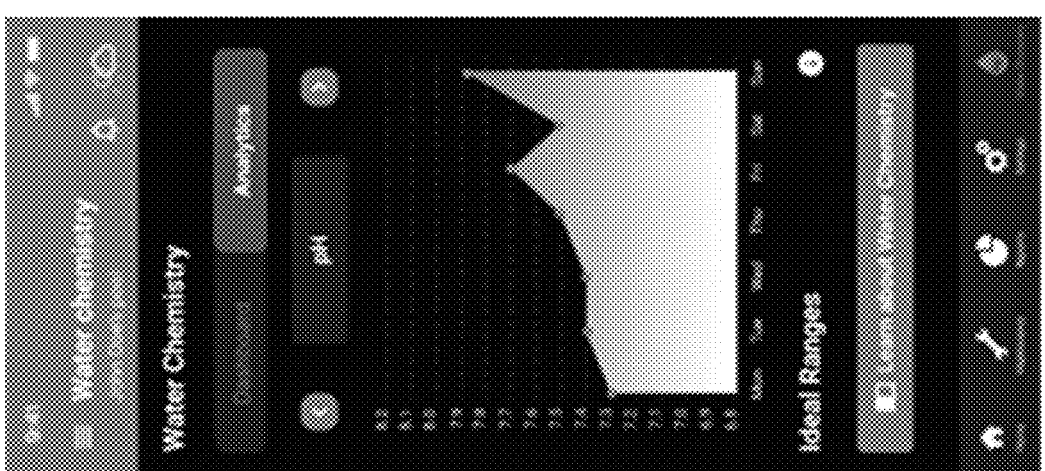
350
FIG. 3E
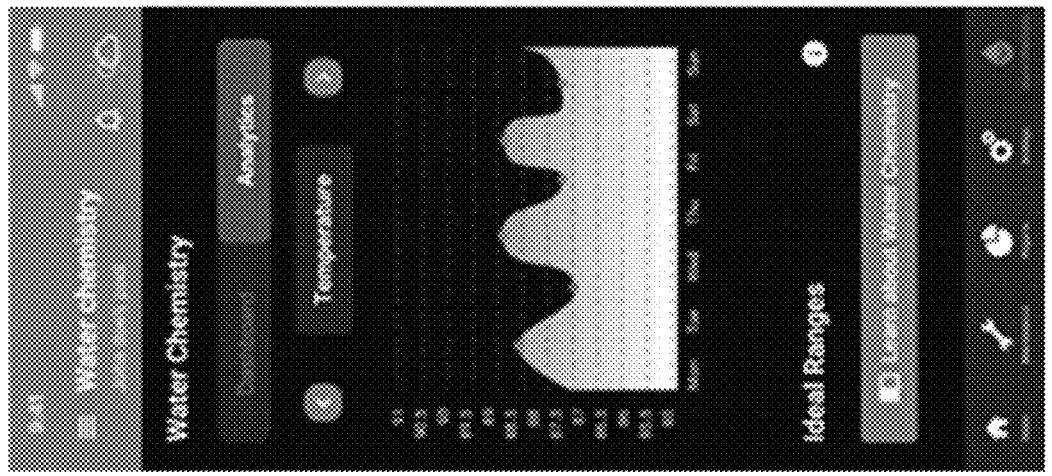
340
FIG. 3D

360

361

362

363

370

371

372

373

374

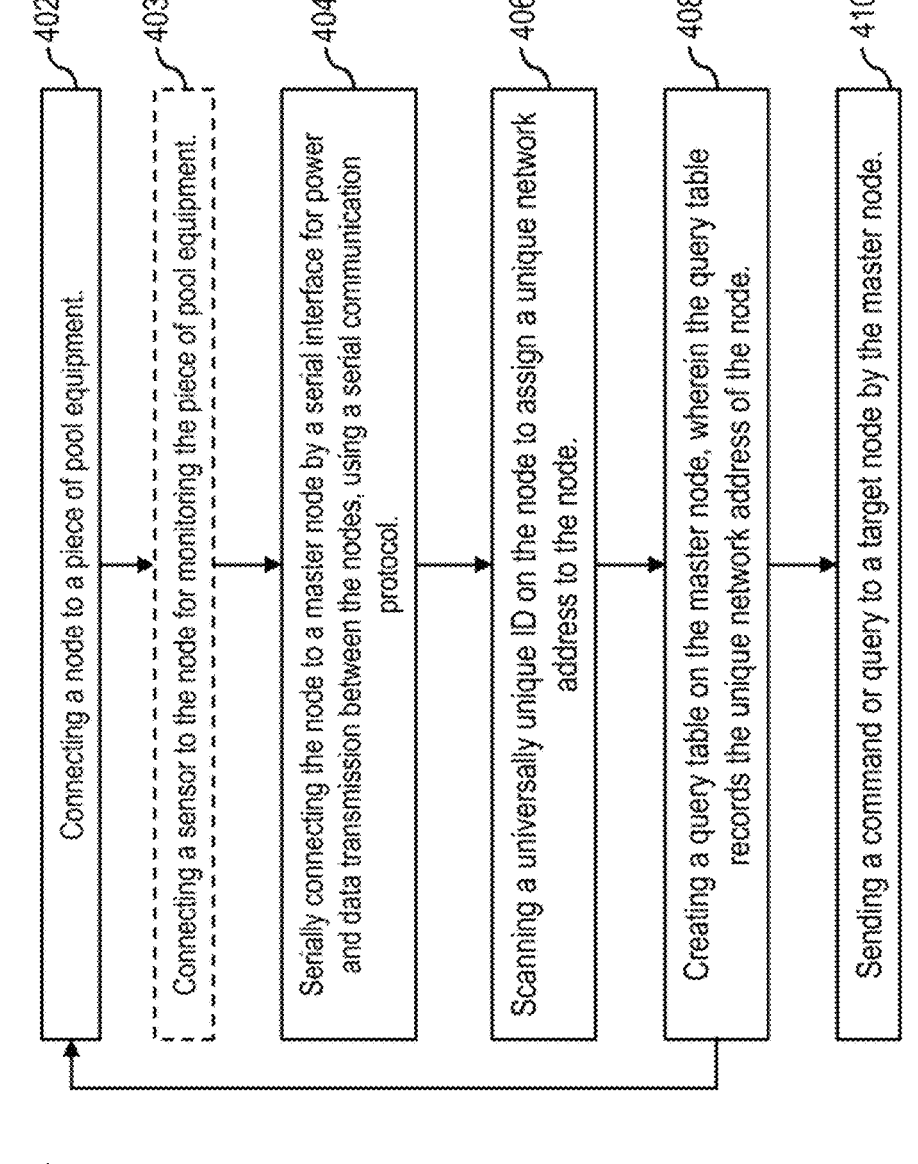

402 — Connecting a node to a piece of pool equipment.

403 — Connecting a sensor to the node for monitoring the piece of pool equipment.

404 — Serially connecting the node to a master node by a serial interface for power and data transmission between the nodes, using a serial communication protocol.

406 — Scanning a universally unique ID on the node to assign a unique network address to the node.

408 — Creating a query table on the master node, wherein the query table records the unique network address of the node.

410 — Sending a command or query to a target node by the master node.

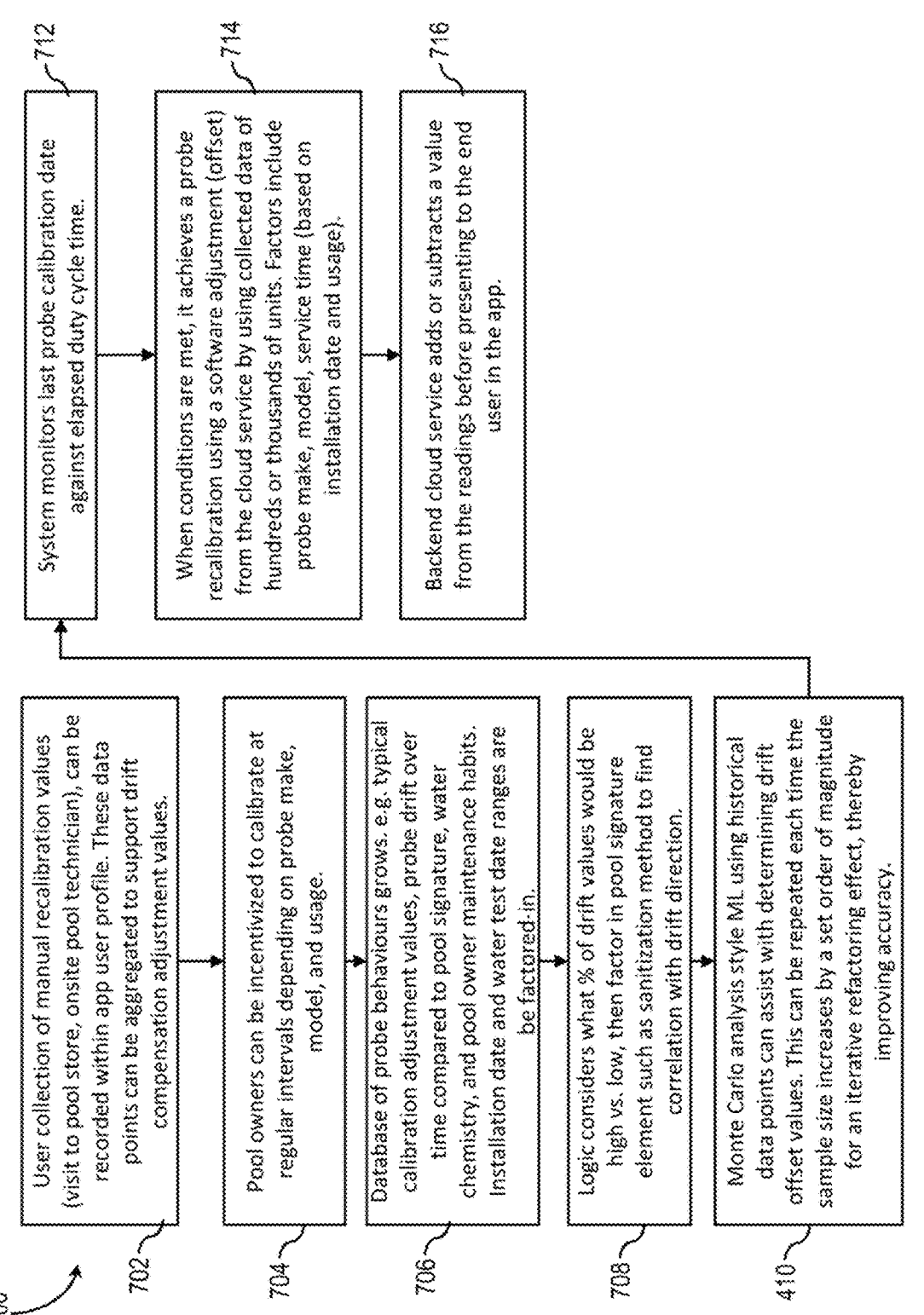

712

System monitors last probe calibration date against elapsed duty cycle time.

714

When conditions are met, it achieves a probe recalibration using a software adjustment (offset) from the cloud service by using collected data of hundreds or thousands of units. Factors include probe make, model, service time (based on installation date and usage).

716

Backend cloud service adds or subtracts a value from the readings before presenting to the end user in the app.

700

702

User collection of manual recalibration values (visit to pool store, onsite pool technician), can be recorded within app user profile. These data points can be aggregated to support drift compensation adjustment values.

704

Pool owners can be incentivized to calibrate at regular intervals depending on probe make, model, and usage.

706

Database of probe behaviours grows. e.g. typical calibration adjustment values, probe drift over time compared to pool signature, water chemistry, and pool owner maintenance habits. Installation date and water test date ranges are be factored-in.

708

Logic considers what % of drift values would be high vs. low, then factor in pool signature element such as sanitization method to find correlation with drift direction.

410

Monte Carlo analysis style ML using historical data points can assist with determining drift offset values. This can be repeated each time the sample size increases by a set order of magnitude for an iterative refactoring effect, thereby improving accuracy.

FIG. 7

SYSTEM AND METHOD TO MONITOR AND CONTROL POOL EQUIPMENT

TECHNICAL FIELD

The embodiments disclosed herein relate to remote monitoring and control of pools, and, in particular to systems, apparatus and methods for monitoring and control of pools and associated pool infrastructure through use of automated monitoring and dynamic control of pool equipment employing a multi-node serial interface network.

INTRODUCTION

Remote monitoring and control of pools is useful for checking the condition of the pool and performing scheduled or preprogramed maintenance (e.g., water circulation for sanitation and water heating for salt-based chlorination) without the user being physically near the pool equipment. Remote monitoring of pools often requires the embedding of sensors or components into a pool itself or attached to, or in connection with, pool infrastructure such as pumps, heaters, chlorinators, etc.

In existing systems, the various sensors and components may be interconnected over a wired (e.g., LAN) or wireless (e.g., Wi-Fi, Bluetooth™, ANT, etc.) network and may implement a Controller Area Network (CAN) bus protocol, or the like, to transmit data between components. Typically, existing systems employ a serial interface for point-to-point communications between two nodes (i.e., communication between two pool monitoring components).

Preprogrammed or prescheduled operation of pool equipment may be achieved by: preprogramming run schedules into pool equipment; manually setting a run schedule on pool equipment at the pool side; wireless/remote control of pool equipment using a connected device; or wireless control by uploading a preprogrammed schedule to pool equipment. A limitation of prescheduled/preprogrammed pool maintenance regimes is that they may operate unnecessarily, or too frequently, when maintenance is not required. For example, a pool pump operating on a prescheduled regime may unnecessarily cycle the water through the filtration system, according to the prescheduled regime, causing the pool water to "turn-over" more times in a 24-hour period than necessary to prevent algae growth. Similarly, a pump may operate throughout the year or pool season, even when the pool is not used for an extended period of time. This leads to inefficiencies in energy and resource usage in pool monitoring and maintenance.

Accordingly, there is a need for new systems and methods for automated near real-time remote pool monitoring and maintenance that conserve energy and expend system resources only when required to maintain the state of a pool without user intervention.

SUMMARY

According to an aspect, there is a system for monitoring and controlling a multi-node pool equipment network. The system includes a main control unit configured as a master node to support a serial communication protocol across a plurality of slave nodes including relay nodes, sensor nodes, valve actuator nodes and power injector nodes. The slave nodes are connected to the main control unit and each other by a serial interface configured for power and data transmission between the master node and the plurality of slave nodes, wherein the main control unit is configured to send a command or a query to the slave nodes over the serial interface using the serial communication protocol. Various slave nodes may be daisy-chained to form a network for power and data transmission between the master node and the slave nodes. The main control unit could contain one or more slave units within the same enclosure. Some slave units could be outside the main box.

Generally, a multi-node network includes the main control unit and may include one or more relay nodes, sensor nodes, valve actuator nodes and power injector nodes. Relay nodes are connected to a piece of pool equipment, to relay power to the piece of pool equipment, and collect its load current signature and report back to the master node. Each relay node is configured to: switch a relay or a load connected to the relay node, report a status of the piece of pool equipment to the main control unit and report a measurement of the output of the piece of pool equipment to the main control unit.

Sensor nodes include a plurality of sensors for measuring water chemistry and transmit the measurements to the master node. Valve actuator nodes are connected valves to adjust the position of the connected valve and report the position of the valve to the master node. Power injector nodes are connected to a power source to inject power into the multi-node network.

The main control unit includes a SIM card or eSIM configured to connect the control unit to a GSM or other cellular wireless network to exchange data with a cloud server. The main control unit receives commands from the cloud through restful APIs. The main control unit queries the status of pool equipment and periodically reports the status to the cloud.

The system includes a user device (e.g., a mobile phone, tablet, laptop computer, desktop computer, or the like) wirelessly connected to the cloud. The user device may be used to view data received by the cloud from the main control unit including the measurements recorded by the sensor nodes. The user device may be used to monitor pool and equipment status and usage statistics and send commands to the main control unit via the cloud to control operation of the equipment in near real-time. Commands received by the main control unit from the user device may be relayed along the nodes to one or more control components and pool infrastructure in real-time or near real-time.

According to an aspect, a prediction and scheduling engine hosted on the cloud is configured to dynamically generate, or update, equipment run schedules for control of pool equipment based on a plurality of inputs without additional user intervention. The inputs include power grid inputs received from a load balancing API and a low carbon emission API. The prediction and scheduling engine may process the power grid inputs to generate an equipment run schedule to minimize the carbon footprint of the pool equipment by scheduling operation during low-carbon phases of the grid. The prediction and scheduling engine may blend a user uploaded planned pool use schedule with other inputs to generate an optimized equipment run schedule based on pool usage.

According to another aspect, there is a method for predicting the failure of pool equipment, the method comprising: measuring historic energy draw for pool equipment over a period of time using a current sensor; implementing a machine learning algorithm to identifying one or more normal energy consumption patterns for the pool equipment based on the historic energy draw; recording a current energy draw for the pool equipment; and comparing the current energy draw to the one or more normal energy consumption patterns to identify a deviation from the one or more normal energy consumption patterns, wherein the deviation is predictive of failure of the pool equipment.

Provided is method for calibrating a probe. Calibrating the probe includes adjusting probe readings by an offset value generated by a difference between a current reading and a test result reading. The test result reading is generated by testing a water sample where the probe is located.

Provided is a method for probe drift compensation. Probe drift compensation includes determining drift compensation adjustment values from probe drift over time compared to any one or more of pool signature, water chemistry, and pool owner maintenance habits. "Drift" is the slow movement of the measured value away from the actual, expected reading of a water sample.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 3D is an exemplary user interface displaying water temperature over time, according to an embodiment;

FIG. 3E is an exemplary user interface displaying pool pH measurements over time, according to an embodiment;

FIG. 4 is a flow chart of a method for installing a multi-mode remote pool monitoring system, according to an embodiment;

FIG. 7 is a flow chart of a method for probe drift compensation, in accordance with an embodiment.

DETAILED DESCRIPTION

Figure 1:
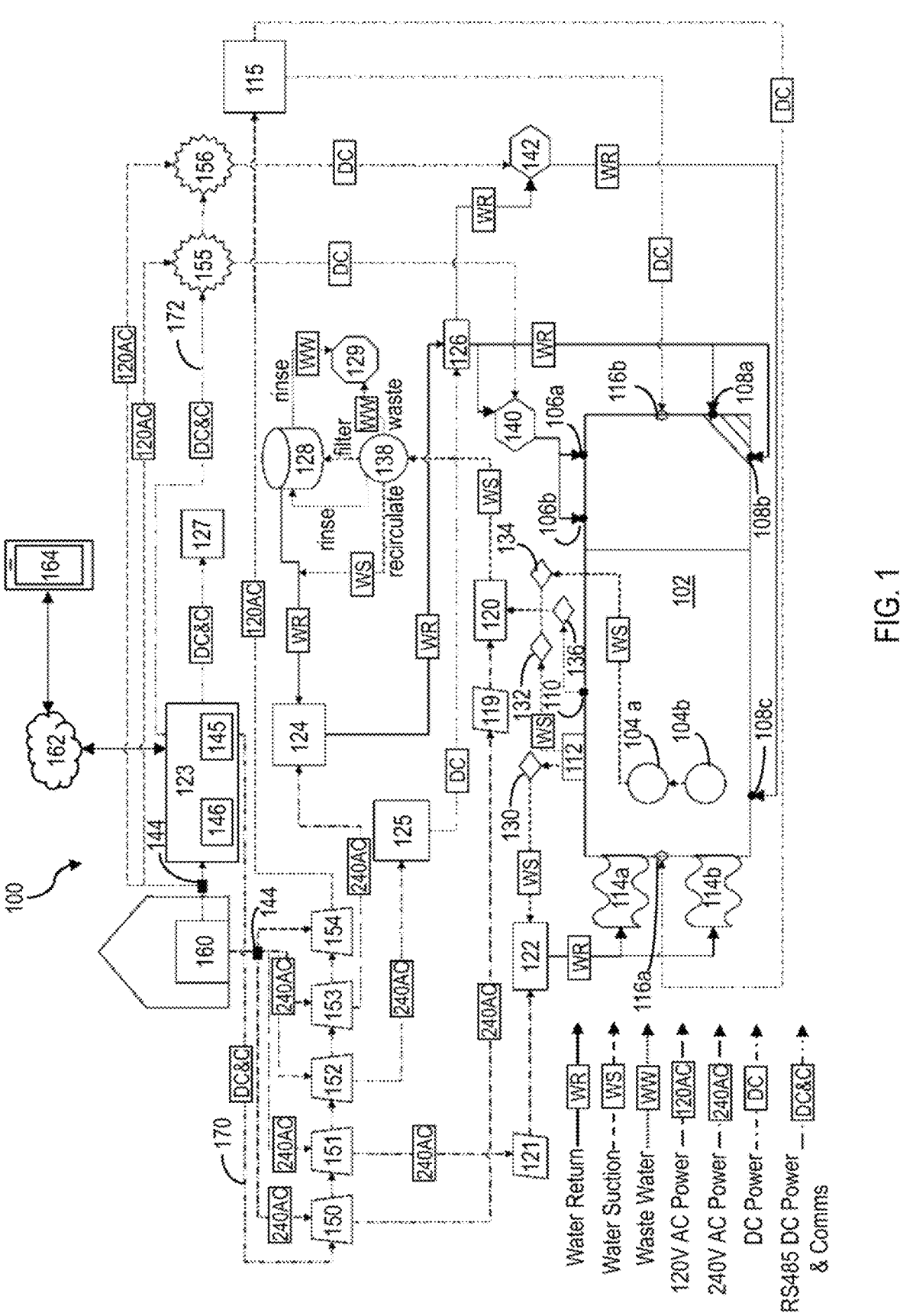
FIG. 1 is a schematic diagram of a multi-node remote pool monitoring system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple processes described below or to features common to multiple process described below or to features common to multiple or all of the apparatuses described below.

One or more systems described herein may be implemented in computer programs executing on programmable computers, each comprising inferencing hardware and/or software for implementing artificial intelligence (AI), machine learning (ML) or machine vision (MV) including at least one processor (not limited to a graphics processing unit (GPU), a vision processing unit (VPU), a tensor processing unit (TPU), field programmable gate arrays (FPGA) or an application-specific integrated circuit (ASIC)) a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

"Pool infrastructure" as used herein refers to pool equipment including, but not limited to: pumps, heaters, chlorinators, UVC sanitation systems, and other pool components such as drains, valves, valve actuators, piping, filters, lighting, laminar flow nozzles, jet nozzles, skimmers and waterfalls.

Referring to FIG. 1, shown therein is a diagram of a pool monitoring system 100, according to an embodiment. The system 100 includes a plurality of pool infrastructure embedded within, or connected to, a pool 102. The pool infrastructure may include drains 104a, 104b, laminar flow nozzles 106a, 106b, jet flow nozzles 108a, 108b, 108c, vacuum ports 110, a skimmer 112, waterfalls 114a, 114b, lights 116a, 116b, pumps 120, 122, a heater 124, a chlorinator 126 and a filter 128. The filter 128 may be a passive filter. According to other embodiments, the pool 102 may include more or fewer pool infrastructure than shown.

Pool infrastructure may be operably connected by valves and piping to draw water from, or return water to, the pool 102. For example, the pump 122 is connected to the waterfalls 114*a*, 114*b* to pump water to the pool 102 and is also connected to the skimmer 112 via a valve 130 to draw water from the pool 102. Similarly, the pump 120 is connected to the skimmer 112 via a valve 132 and is connected to the drains 104*a*, 104*b* via a valve 134 and is further connected to the vacuum port 110 via valve 136 to draw water from the pool 102. The pump 120 is also connected to the heater 124 and the filter 128 via a multiport valve 138.

The multiport valve 138 may be manually configured to: direct pool water from the pump 120 to the heater 124 to recirculate the pool water; direct water from the pump 120 to the filter 128 to clean the pool water; or direct water from the pump 120 to waste 129 (i.e., a sewage/drainage system) to drain the pool 102. Each valve 130, 132, 134, 136, 138 may be connected to an electronic valve actuator card for remote, or automated control of the respective valve.

Pool water passing through the heater 124 is directed to the chlorinator 126. The chlorinator 126 is connected to the laminar flow nozzles 106*a*, 106*b* and the jet flow nozzles 108*a*, 108*b*, 108*c* via solenoid valves 140, 142 to return water to the pool 102.

The system 100 includes control components for controlling the operation of certain pool infrastructure. The system 100 include toggle switches 119, 121 for controlling the operation of the one or more pumps 120, 122. The system 100 may include a pool light transformer 115 for controlling the operation of the lights 116*a*, 116*b*. The system 100 includes a chlorinator control panel 125 for controlling the operation of the chlorinator 126. According to some embodiments, the control component may be combined with the corresponding pool infrastructure, as a single unit.

The system 100 includes a main control unit 123. The main control unit 123 includes a SIM card or eSIM configured for connecting to GSM (e.g., 2G/3G/4G/LTE/NB-IOT) or other cellular wireless networks to exchange data with a cloud 162 (i.e., a cloud hosted computer server or servers).

The cloud 162 may be configured to: provide a cloud services platform and user portal; generate dynamic scheduling for control of pool infrastructure; implement machine learning for predicting failure of pool infrastructure; implement a Low Carbon Mode to run the pool equipment when the power grid is running on less carbon/fossil fuels; and implement power grid APIs to connect with various power grid services as described below.

The main control unit 123 may receive commands from the cloud 162 through restful APIs. The main control unit 123 queries the status of pool infrastructure and periodically reports the status to the cloud 162.

The main control unit 123 may include an optional rechargeable battery 146, for use in temperate climates, to power the main control unit 123 and maintain a connection to the cloud 162 during power outages. The battery 146 may be removed during the winter season. The main control unit 123 may be configured to report a power outage, the restoration of power supply, and the live power status of the main control unit 123 and connected pool equipment, to the cloud 162 in order to properly shut down the system 100 and reschedule or postpone equipment run schedules. The main control unit 123 may be configured to employ "heartbeat" signaling, as described below, to indicate the power status of the control unit 123 and connected pool equipment to the cloud 162.

The main control unit 123 is connected to the pool infrastructure, or control components, by a network of relay nodes 150, 151, 152, 153, 154, 155, 156. According to other embodiments, the system 100 may include more or fewer nodes than shown. Each relay node is connected to a piece of pool infrastructure either directly (for example, relay node 153 connected to the heater 124) or via a control component (for example, relay node 152 connected to the chlorinator 126 via the chlorinator control panel 125).

Each relay node 150, 151, 152, 153, 154, 155, 156 may further include one or more of: a current sensor, an acoustic sensor such as a microphone/audio sensor, and an accelerometer/vibration sensor to measure the output behaviour of a piece of pool equipment connected to the relay node. For example, pool pump components, such as sealed bearings, are generally prone to degradation causing the pump to operate less efficient, and thus work "harder" and expend more energy to circulate pool water. According to an embodiment, the relay node 151 connected to the pump 122 may include an audio sensor (e.g., a microphone or hydrophone) for monitoring operation of the pump 112 to detect the noise, and/or a change in noise profile, emitted by the pump during operation and start/stop phases, which may be indicative of degradation of pump components.

According to some embodiments, the relay nodes 150, 151, 152, 153, 154, 155, 156 connected to pool equipment may include a current sensor for monitoring the current draw of the piece of equipment the relay node is connected to, which gives a true indication of the equipment's status. In particular, the current sensor monitors the steady state energy consumption by the equipment and the initial power-up and de-energizing current waveforms and off-surge current patterns. The current measurements may be received as inputs by a machine learning model running on the cloud 162 to predict future failure/fatigue associated with the equipment.

The relay 150, 151, 152, 153, 154, 155, 156 nodes may be configured to relay heartbeat signaling between the connected pool equipment and the cloud 162 to indicate normal operation when the equipment is switched on and employ a safety protocol if the connection to the cloud 162 is broken. Similarly, valve actuator nodes 130, 132, 134, 136, 138 may be configured to relay heartbeat signals between the connected valves and the cloud 162.

The heartbeat signal is emitted by the cloud 162 at a specified interval. If the heart-beat signal is not received by the pool equipment within a specified time, the node can shut down or cut power to the piece of connected equipment for safety reasons. For example, if the cloud 162 is scheduled to run the pump 122 for one (1) hour, instead of sending an "OFF" signal one hour after sending an "ON" signal, the heartbeat signal will be sent from the cloud 162 to the pump 122 at 10-minute intervals while the pump is operating. The 151 node connected to the pump 122 is configured with an 11 minute expiry timer that is reset upon receiving the ON heartbeat signal, where if the ON heartbeat signal is not received before expiry of the 11-minute window (11 minute window >10 minute heartbeat signal interval), the power to the pump 122 will be switched off.

Similarly, heartbeat signaling between the cloud 162 and pool equipment may be used to restart an equipment run schedule that was interrupted (e.g., due to power outage, etc.) once the connection to the cloud 162 and the heartbeat is reestablished. For example, if the main control unit 123 reports a power outage to the cloud 162, the cloud will signal the main control unit 123 every five minutes to check the power status. Once the power is restored, the cloud 162 will resume equipment run schedules and transmit the appropriate commands to the control unit 123.

The system 100 may include a water analysis unit 127. The water analysis unit 127 includes one or more sensors/probes for measuring the water chemistry and temperature in the pool 102. The sensors/probes may include a potentiometer (potential of Hydrogen probe), a redox (oxidation-reduction potential) probe, an electrical conductivity sensor, an ambient temperature sensor, a water temperature sensor and a relative humidity sensor. The various probes are inserted vertically and perpendicularly to a section of pipe (e.g., a water return pipe) that is parallel to the ground. The water analysis unit 127 may be further configured to sample the ambient temperature and relative humidity to calculate pH, oxidation-reduction potential and electrical conductivity data points.

The water analysis unit 127 is considered a sensor node for the purposes of networked communications with the main control unit 123. For example, the water analysis unit 127 samples the water quality upon receiving a command from the main control unit 123 (master node) and sends the measurements over the network to the main control unit 123.

The valves 130, 132, 134, 136, 138 connected to valve actuator cards are considered valve actuator nodes for the purposes of networked communications with the main control unit 123. The valve actuator nodes may receive commands from the main control unit 123 for controlling the opening/closing of a connected valve 130, 132, 134, 136, 138 and querying the status of the valve's position. For example, in the case of multiport valve 138, the connected valve actuator card may alter the direction of flow out of the valve 138 and reports the direction of the flow to the main control unit 123.

Each node 127, 130, 132, 134, 136, 138, 150, 151, 152, 153, 154, 155, 156 has a serial interface for ease of network installation and setup. Typically, a serial interface is meant for point-to-point (peer-to-peer) communication, between two (2) nodes. Advantageously, the system 100 is configured to employ a serial communication protocol on a multi-node network with one (1) main control unit 123 (i.e., a master node) and multiple slave nodes 127, 130, 132, 134, 136, 138, 150, 151, 152, 153, 154, 155, 156. That is, the slave nodes 127, 130, 132, 134, 136, 138, 150, 151, 152, 153, 154, 155, 156 can each control and collect data from equipment/sensors with different interfaces and communicate with the main control unit 123 by serial communication. Each slave node 127, 150, 151, 152, 153, 154, 155, 156 may support one or more serial communication protocols for communicating with and relaying data/signals between pool infrastructure components and the main control unit 123. Generally, any device/node that supports a serial communication protocol used by the system 100 can be a slave node.

Each node 127, 130, 132, 134, 136, 138, 150, 151, 152, 153, 154, 155, 156 includes two (2) RJ45 (ethernet) connectors, one for input and the other for output, which allows for a plurality of nodes to be daisy-chained for transmission of electrical power and transmission of data, preferably using a transport mode on a RS-485 bus. Beneficially, such a configuration can support long range over-ethernet connectivity to supply power to nodes/equipment that are remote from an AC power source. Each node 127, 150, 151, 152, 153, 154, 155, 156 further includes a microcontroller configured for: switching a connected relay/load; reporting the status of the connected load; and reporting the signal recorded by connected sensors. According to other embodiments, each node 127, 150, 151, 152, 153, 154, 155, 156 may include components for wireless network communication (i.e., Wi-Fi, Zigbee™ or Bluetooth).

Each node 150, 151, 152, 153, 154, 155, 156 may be provided as a "dongle" (for attaching to smaller pool infrastructure) or in an enclosure for retrofitting existing pool equipment and control components. According to some embodiments, each node 150, 151, 152, 153, 154, 155, 156 may be constructed to specifically connect to a particular piece of pool equipment. According to other embodiments, each node 150, 151, 152, 153, 154, 155, 156 may be configured to connect with a plurality of pool equipment.

The system 100 may include one or more daisy-chains of networked nodes. For example, a first daisy-chain 170 includes the nodes 150, 151, 152, 153, 154; a second daisy chain 172 includes the nodes 155, 156. Each node 150, 151, 152, 153, 154, 155, 156 includes an ID chip having a universally unique ID (UUID). Each node 150, 151, 152, 153, 154, 155, 156 is assigned with a unique network address, whereby the main control unit 123 can address and send a command or query to a specific slave node. At any given time, the main control unit 123 (master node) can only address one slave node. A network query table is created on the master node in the main control unit 123 to record which ID corresponds to each connected node in the daisy-chain, its capabilities and roles. The main control unit 123 has its own UUID associated with its SIM card information stored on the cloud 162.

As an example, in the first daisy-chain 170, the main control unit 123 is the master node connected to the slave nodes 150, 151, 152, 153, 154. As noted above, each slave node is configured to switch a connected relay/load; report the status of the connected load; and report the status of connected sensors. For example, slave node 153 can relay power and data between the slave nodes 152, 154; report the status of the connected load (i.e., heater 124) to the main control unit 123; and report the status of any connected sensors, for example, a current sensor for measuring the output of the heater 124, to the main control unit 123. However, only the main control unit 123 may send a command or query the slave nodes 151, 152, 153 and 154 to receive status reports. Data relayed along the nodes 151, 152, 153, 154 to the main control unit 123 may be transmitted to the cloud 162 for storage and/or processing.

The main control unit 123 includes a power injector module 145 to power downstream nodes 150, 151, 152, 153, 154 on the daisy chain 170. While the nodes 150, 151, 152, 153, 154, 155, 156 may be used for the transmission of DC current and data over RJ45/Ethernet cables using an RS485 protocol in a daisy-chain, daisy-chaining can only transmit sufficient power for up to 4-5 daisy-chained devices having a relatively low electrical load. Accordingly, each node 150, 151, 152, 153, 154, 155, 156 may also be directly connected to an AC power source 160. Intermediary power injector nodes 144 can be installed between slave nodes if required to supply the power to the subsequent nodes.

The system 100 includes a user device 164. The user device 164 may be a mobile device such as a smartphone, tablet, laptop computer or the like, installed with an application to connect to the cloud 162 over a wired or wireless network. The application may be a native application stored in a memory of the user device 164. The application may be a web-based application that is accessible using a web browser installed on the user device 164. The user device 164 may be remotely located with respect to the cloud 162 and the pool infrastructure.

The user device 164 may be used to view data received by the cloud 162 from the main control unit 123, for example, the measurements recorded by sensors connected to the nodes. The user device 164 may be used to enter inputs transmitted to the cloud 162. The user device 164 may be used to monitor pool and equipment status and usage statistics and send commands to the main control unit 123 via the cloud 162 to control operation of the equipment in near real-time. For example, a run schedule for pool equipment may be input by a user using the user device 164 and may be uploaded to the cloud 162 and received by the main control unit 123. Commands received by the main control unit 123 may be relayed along the nodes to one or more control components and pool infrastructure in real-time.

Figure 5:
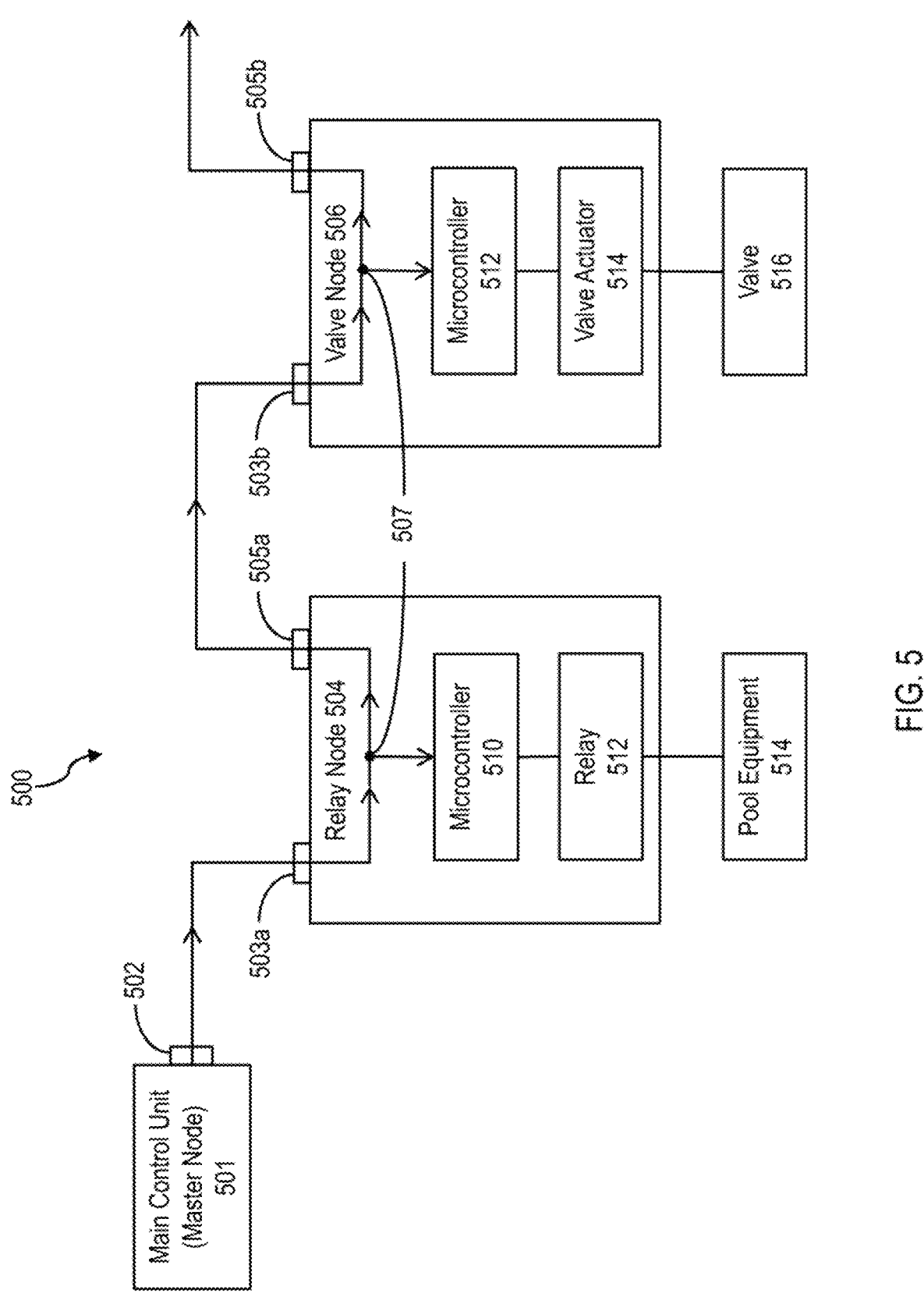
FIG. 5 is a diagram of a daisy-chain for data transmission, according to an embodiment.

Referring to FIG. 5, shown there is a diagram of a daisy-chain 500 for data transmission, according to an embodiment. The daisy chain 500 includes a main control unit (i.e., a master node) 501 at one end. The main control 501 unit may be the main control unit 123 in FIG. 1. The main control 501 unit includes a plurality of RJ45 connectors (a representative RJ45 connector 502 is depicted). The main control unit 501 serial RS485 bus outputs are allocated the same pins, for example, Pin 1 and Pin 2 on each RJ45 connector 502.

The daisy chain 500 includes two slave nodes connected to the main control unit 502. The first slave node is a relay node 504 and the second slave node is a valve actuator node 506. According to other embodiments, the daisy chain 500 may comprise more than two slave nodes and may also include sensor nodes and power injector nodes. Nodes may be connected in any order in the daisy chain 500. The relay node 504 includes a microcontroller 510, a relay 512 and is connected to a piece of pool equipment 514 (e.g., a pump, a heater, etc.). The valve actuator node 506 includes a microcontroller 512, a valve actuator card 514 and is connected to a valve 516.

Each slave node 504, 506 includes an input RJ45 connector 503a, 503b, an output RJ45 connector 505a, 505b and bypass connections 507. In each node 504, 506 the input RJ455 connector 503a, 503b pins are directly jumped to the output RJ45 connector 505a, 505b via the bypass connections 507. Pin 1 and Pin 2 from the input RJ45 connectors 503a, 503b are tapped on each node 504, 506 and connected to the respective microcontrollers 510, 512 through an RS485 translator (not shown). FIG. 5 shows one directional data travel along the daisy chain 500 from the main control unit 501 to the relay node 504 and to the valve node 506. It should be noted that data can be transmitted/received bidirectionally along the daisy chain 500 between the respective "input" RJ45 connectors 503a, 503b and the "output" RJ45 connectors 505a, 505b on the nodes 504, 506.

Figure 2:
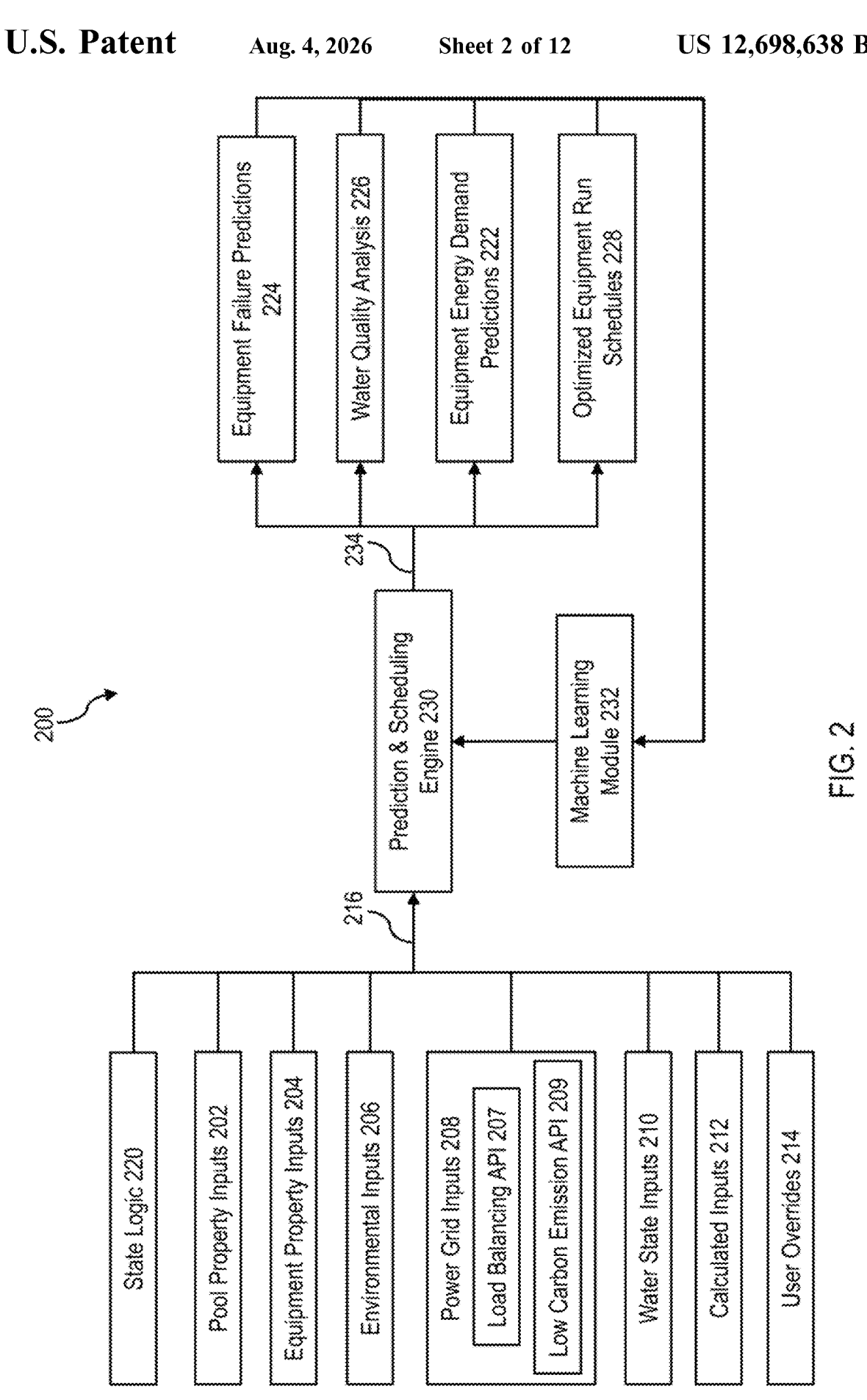
FIG. 2 is a box diagram of a machine learning model for automated dynamic monitoring and scheduling of pool equipment, according to an embodiment.

Referring to FIG. 2, shown there is a diagram of a machine learning model 200 for automated dynamic monitoring and scheduling of pool equipment, according to an embodiment. The machine learning model 200 may be implemented by the cloud computer system 162 in FIG. 1. Automated dynamic monitoring and scheduling refers to the near real-time monitoring of pool equipment, with little to no user intervention after setup, and the automated scheduling of pool equipment based on the near real-time monitoring and a "pool signature". "Pool signature," refers to a collection of characteristics that are specific to the pool and describe the pool and/or the surrounding environment the pool is located. The collection of characteristics includes pool property inputs 202, equipment property inputs 204, environmental inputs 206, power grid inputs 208, water state inputs 210, calculated inputs 212, user overrides 214, and state logic 220, collectively, inputs 216. The inputs 216 may be received in near real-time.

Pool property inputs 202 include physical characteristics about a pool, such as pool shape, pool volume, pool dimensions, length of head, etc. Pool property inputs 202 may be entered by a user (or installer) using a user device (i.e., user device 164 in FIG. 1) and are received and stored by a cloud server (i.e., cloud 162 in FIG. 1).

Figure 3A:
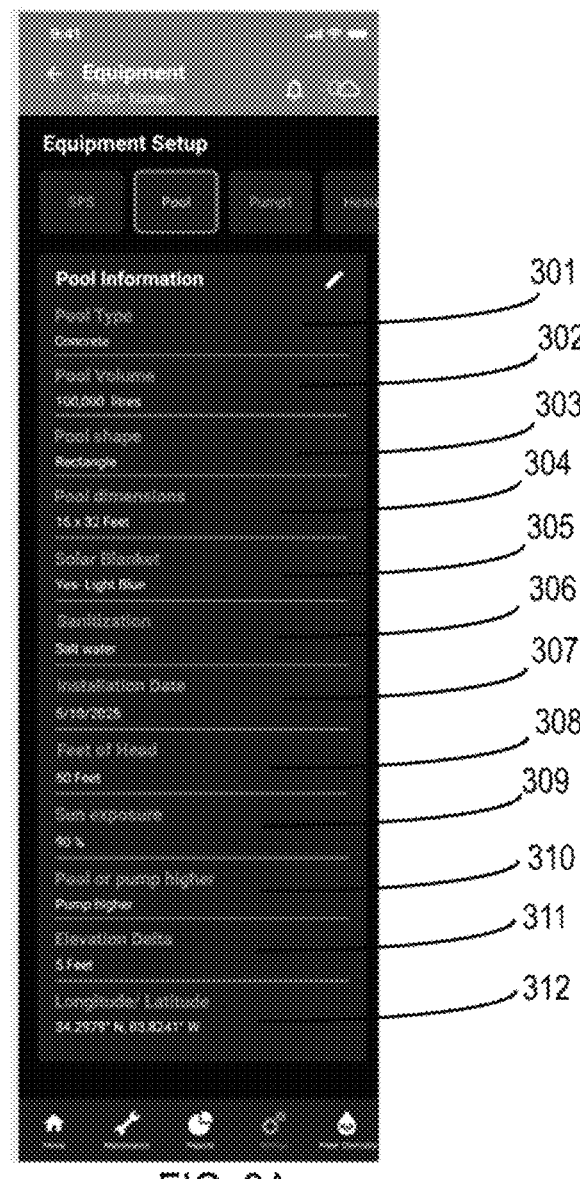
FIG. 3A is an exemplary user interface for pool property inputs, according to an embodiment.

Referring to FIG. 3A, shown therein is an exemplary user interface 300 on a user device for entering pool property inputs, according to an embodiment. The user interface 300 may include selectable drop-down lists of the pool property inputs retrieved from the cloud, and/or user editable fields for entering a pool type (concrete, tiled or linear) 301, a pool volume 302, a pool shape 303, pool dimensions 304, use of a solar blanket 305, a sanitization type (chlorine, salt water) 306, an installation date 307, a length of head 308, a percentage of pool exposed to sun 309, pump elevation relative to the pool 310, an elevation difference 311 and geographic coordinates (latitude, longitude) for the pool 312.

Referring back to FIG. 2, equipment property inputs 204 include specifications of pool infrastructure equipment such as make, model, power rating, and rating capacity (e.g., flow rate for a pump; BTU rating for a heater), etc. Equipment property inputs 204 may be entered by a user using a user device, or may be retrieved from cloud storage based on user input. For example, when the user selects the make and model for a particular heater, other information for the heater, such as the BTU rating may be automatically retrieved by the cloud.

Figure 3B:
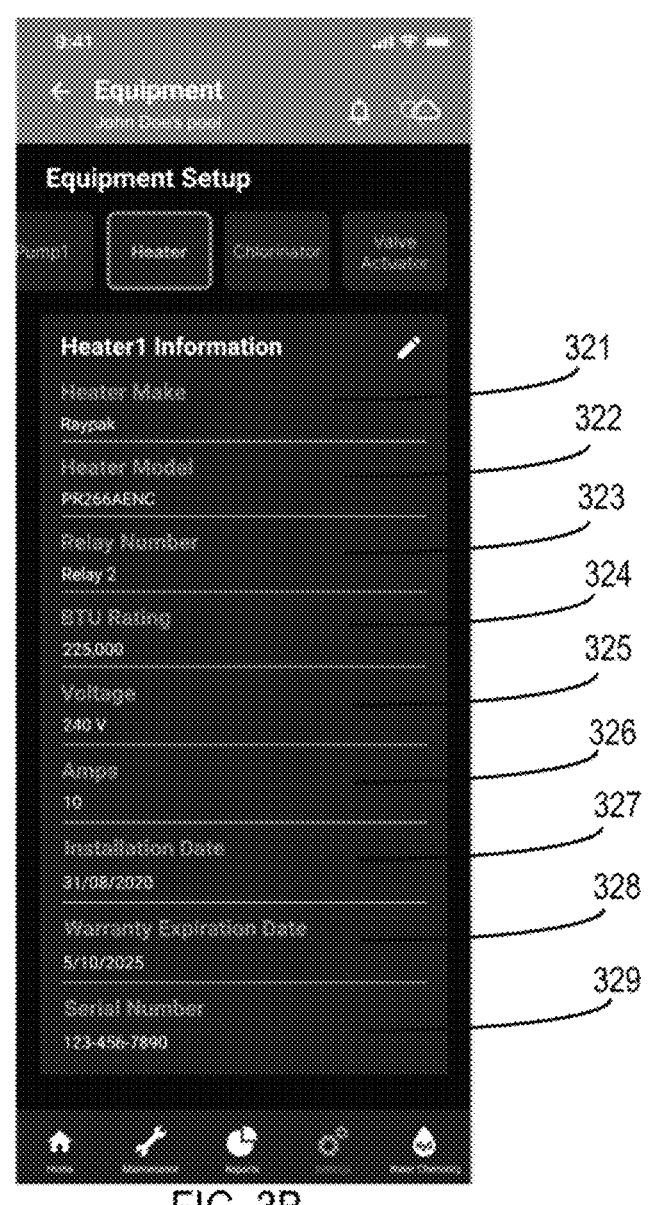
FIG. 3B is an exemplary user interface for equipment property inputs, according to an embodiment, according to an embodiment.

Referring to FIG. 3B, shown therein is an exemplary user interface 320 on a user device for equipment property inputs for a heater, according to an embodiment. The equipment property inputs include, a heater make 321, a heater model 322, a relay number 323, a BTU rating 324, a voltage setting 325, a current setting 326, an installation date 327, a warranty expiration date 328 and a serial number 329.

Referring back to FIG. 2, environmental inputs 206 include latitude and longitude, solar noon and pool shade/sun exposure as a percent coverage of the pool surface area. Environmental inputs 206 may be entered by a user using a user device, or may be retrieved from cloud storage based on user input. For example, when a user enters their location or enables GPS on the user device, the latitude and longitude may be retrieved from the cloud.

Power grid inputs 208 include: (1) power grid infrastructure inputs including a postal code (for grid load calculations), geographic coordinates (latitude, longitude) for the pool and a count of pools on the same grid substation based on the location of other pools implementing the system 100 as recorded in the cloud database; (2) input from a power grid load balancing API 207; and (3) input from a power grid run time low carbon emission API 209. The APIs 207, 209 may be restful APIs that connect to and exchange data with a power grid provider system.

Water state inputs 210 include a current water temperature, relative/ambient humidity received from sensor nodes, a water chemistry analysis and a pool heat gain/loss factor (rate of heat lost by the pool). The water chemistry analysis may be received from sensor nodes, or may include a "manual" water analysis performed by a user. For example, a manual water analysis may comprise combining a sample of pool water with a test paper or reagent to observe a color change indicating concentrations of one or more analytes. The color change may be compared against a reference sample or a photo/video of the sample may be captured using the user device (i.e. the user device 164 in FIG. 1) and uploaded to the cloud for analysis.

The pool heat gain/loss factor may be determined by sampling the water temperature at regular intervals and comparing with the air temperature and humidity over a period of time, accounting for factors such as wind, use of a solar blanket, surface area of the pool and time of year. The heat gain/loss factor may be calculated with/without heater operation or with/without pump operation. The water state inputs 210 may be recorded by a water analysis unit (i.e., water analysis unit 127 in FIG. 1) and received by the cloud.

Figure 3C:
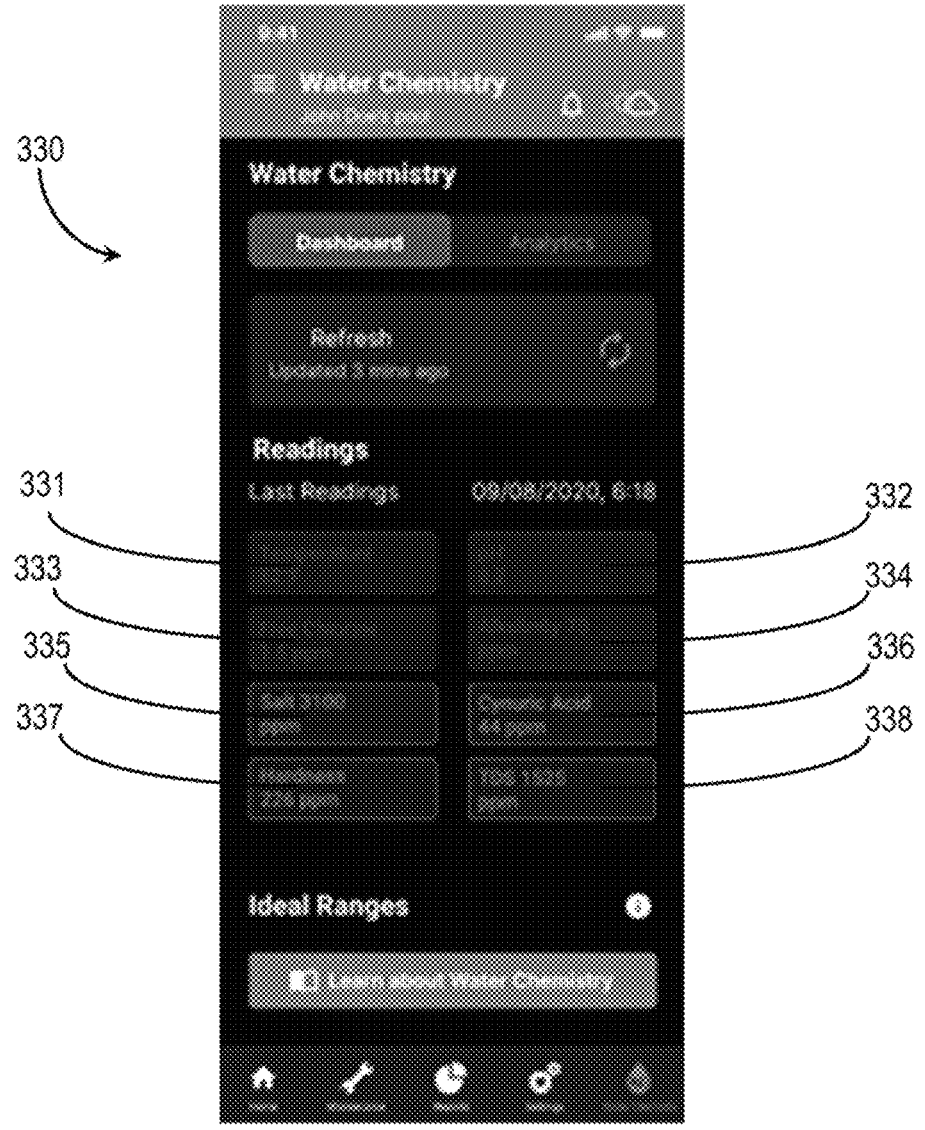
FIG. 3C is an exemplary user interface for water chemistry readings, according to an embodiment.

Referring to FIG. 3C, shown therein is an exemplary user interface 330 on a user device displaying water chemistry readings, according to an embodiment. The water chemistry readings include water state inputs 210 retrieved from the cloud. The user interface 330 includes a current water temperature 331 and a water chemistry analysis including a pH measurement 332, an alkalinity level 334, a free chlorine level 333, a salt level 335, a cyanuric acid level 336 a water hardness 337 and a total dissolved solids measurement 338.

The free chlorine level 333 is estimated using a matrix and algorithms to avoid incorporating expensive probes. According to other embodiments, the user interface 330 may display a simplified water quality status, for example "read to swim" or "not ready to swim", rather than the raw water chemistry values 331, 332, 333, 334, 335, 336, 337, 338. According to other embodiments, changes in the water chemistry over time may be displayed. Referring to FIGS. 3D-3E shown therein are exemplary user interfaces 340, 350 displaying the water temperature (FIG. 3D) and pH measurements (FIG. 3E) over time.

Referring again to FIG. 2, calculated inputs 212 include the historic (actual) equipment power draw and the estimated water turn-over time. The historic equipment power draw is recorded by current sensors in relay nodes connected to the pool equipment such as heater, pumps, chlorinator, etc., and is received by the cloud. The estimated water turn-over time may be generally estimated as the pool volume divided by the pump flow rate.

User overrides 214 include a typical weekly swim schedule, user input run time overrides and user reported equipment failure. User input run time overrides may correspond to trips/vacation time away from home, or generally known periods where the pool will not be used, and thus may be used to adjust scheduled operation of pool equipment. For example, a run time override may be input when there is no need to heat the pool when no one will swim for several days, however the water must remain at a minimum temperature suitable for salt-based chlorinators to function properly, and the pool must be at the preferred temperature set point by the time the user returns. The user overrides 214 are entered by a user using a user device.

Figure 3F:
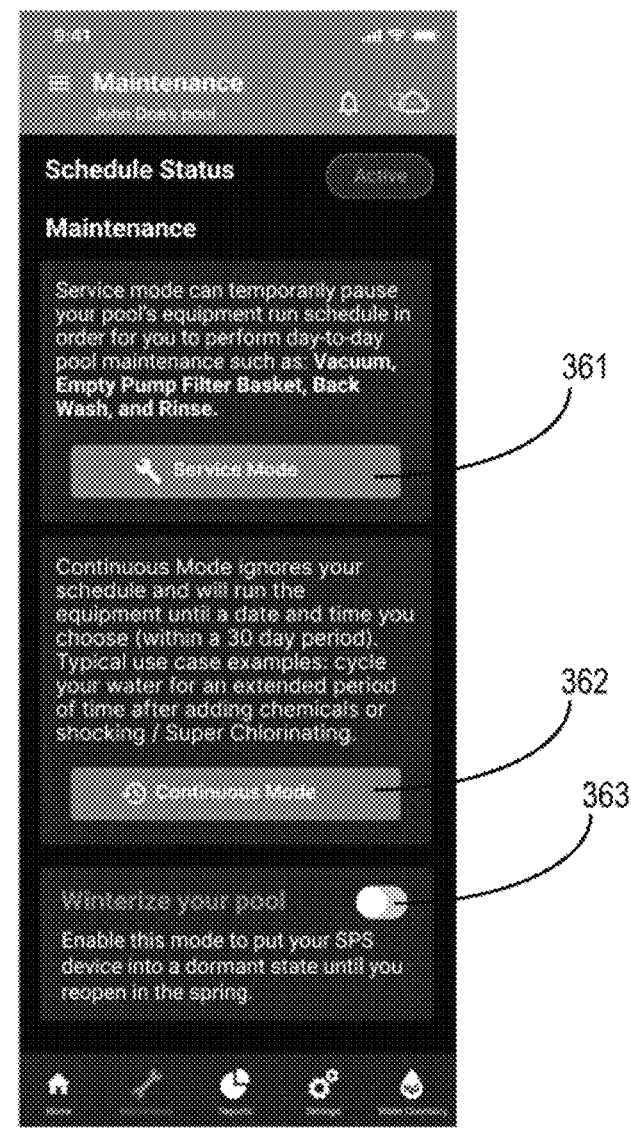
FIG. 3F is an exemplary user interface for user run time overrides, according to an embodiment.

Referring to FIG. 3F, shown therein is a shown therein is an exemplary user interface 360 on a user device 301 displaying run time overrides, according to an embodiment. Run time overrides include a user setting of a service mode 361 or a continuous mode 362. In service mode 361, pool equipment run schedule is turned off to allow the user to safely perform manual pool maintenance, such as emptying a pump filter basket or backwashing and rinsing a filter. In continuous mode 362, pool equipment will run continuously until a selected time irrespective of the run schedule. Another run time override is a winterized mode 363 wherein the system enters a dormant state until the pool is reopened for the season.

According to an embodiment, run time overrides include an anti-freeze mode (not shown), wherein the pump and heater are run continuously to circulate pool water and maintain the water temperature above 0° C. to prevent pool water from freezing and breaking/fracturing pipes and other pool infrastructure when the ambient temperature (including wind-chill factor) drops below 4° C.

Referring again to FIG. 2, the state logic 220 is a series of query functions that provide additional inputs 216 including: whether the pool is winterized; whether a chlorine shock is required; whether a stabilizer was used; whether there was recent heavy rain; whether the water temperature is less than or equal to two (2) degrees Celsius below the user set point; whether a user override command was received, what are the local weather patterns (e.g., sun rise time, wind speed, ambient air temperature), etc. The state logic 220 may further include default rules for efficient pool equipment run scheduling. For example, a default rule may state the heater must shut off 20 minutes prior to the pump in order for the heater to cool down via the water pumped through its internal pipes (this also allows the pool water to capture the remaining heat from the heater).

Inputs 216 to the machine learning model 200 are received by a prediction and scheduling engine 230 hosted on the cloud (i.e., cloud 162 in FIG. 1) in near real-time. The prediction and scheduling engine 230 is configured to implement AI and ML driven algorithms to process the inputs 216 to generate outputs 234, namely, equipment failure predictions 224, water quality analysis 226, equipment energy demand predictions 222 and optimized equipment run schedules 228 to efficiently control operation of pool equipment. The outputs 234 may be stored by the cloud and/or transmitted to a user device for viewing by a user. The outputs 234 may be transmitted to a main control unit (i.e., main control unit 123 in FIG. 1) as commands for changing the operation of one of more pieces of pool equipment or control components.

Equipment failure predictions 224 are generally generated from analysis of cloud-stored historic energy draw patterns for a piece of equipment (received as calculated inputs 212) and comparison to a current power draw state of the equipment to identify deviations from a normal energy draw pattern. User reported equipment failure (received as user overrides 214) may be used to retrieve the historic energy draw patterns, before and after the failure, which are analyzed by the machine learning module 232 and fed to the prediction and scheduling engine 230 to improve the accuracy of equipment failure predictions 224. The equipment failure predictions 224 may include warnings sent to the user device to warn of a predicted equipment failure or to notify that they equipment is not operating normally. The equipment failure predictions 224 may include commands sent to the main control unit (i.e., main control unit 123 in FIG. 1) to preemptively stop operation of equipment predicted to fail.

The water quality analysis 226 is generally based on water state inputs 210. In particular, the prediction and scheduling engine 230 may be configured to automatically generate a report of water chemistry by interpreting a color change as seen in a photo of a test strip or reagent mixed with a sample of pool water and uploaded to the cloud from a user device. The prediction and scheduling engine 230 may be configured to implement machine vision (MV) to compare such a sample image to reference/standard images stored in the cloud to determine the concentration of an analyte or, generally a state of the pool water (e.g., chlorine is too high, do not swim). The water quality analysis 226 may include a report or warning sent to the user device (i.e., user device 164 if the water chemistry is outside an acceptable range. The water quality analysis 226 may include commands sent to the main control unit (i.e., main control unit 123 in FIG. 1) to adjust pool water chemistry by controlling operation of relevant equipment such as a chlorinator.

The equipment energy demand predictions 222 includes an estimate of the energy consumption for pool equipment for a twenty-four hour period based on the pool signature (i.e., the inputs 216). The energy demand predictions 222 may be expressed as an estimated savings by comparing the projected run time demand to running the pool equipment for 24 hours per day based on historic equipment power draw. The runtime demand 222 may be used to turn pool equipment on/off remotely, by, for example, setting a threshold for energy consumption by a piece of pool equipment, if exceed by the runtime demand, causes the pool equipment to stop operation.

The equipment energy demand predictions 222 may include an audit of low carbon emission footprint for the pool based on a daily, weekly, monthly or yearly basis according to power grid inputs 208 received from the load balancing API 208 and low carbon emission API 209. Such an audit may be beneficial for the purposes of claiming a tax credit for the installation and use of low carbon footprint technology. The equipment energy demand predictions 222 may include a report or warning sent to the user device if pool equipment is predicted to be operating inefficiently. The equipment energy demand predictions 222 may be reported back to power grid providers, via the load balancing API 208. The energy demand predictions 222 may be used to estimate the power consumption in an area for the next 24 hours with respect to pool equipment, applying a probability weighting function.

The optimized equipment run schedules 228 are generated based on the pool signature (i.e., the inputs 216), in particular, user overrides 214 including the manually entered user schedules stored in the cloud, and power grid inputs 208 including the carbon emission rates associated with the local power grid as received from the load balancing API 207 and low carbon emission API 209. The prediction and scheduling engine 230 may be configured to minimize, as much as possible, the overall carbon footprint for the operation of pool infrastructure by scheduling pool maintenance operations during low-carbon phases of the grid, while complying with user overrides 214, to generate the optimized equipment run schedules 228. Implementation of the optimized run schedules 228 by the system may be commenced by the user selecting a "low carbon" operational mode.

The optimized equipment run schedules 228 may be dynamically created, or updated, by the prediction and scheduling engine 230 based on the inputs 216 without any further user intervention after entering the initial inputs 216 and equipment run schedule. For example, the prediction and scheduling engine 230 can dynamically change an existing run schedule based on the power grid inputs 208 received since the run schedule was initially created or last update.

The prediction and scheduling engine 230 may also be configured to dynamically blend pre-programmed schedule events with user preferences and user overrides 214 to generate the optimized equipment run schedules 228.

The machine learning model 200 includes a machine learning module 232. The machine learning module 232 may be configured to implement deep learning to analyze the outputs 234 in near real-time and provide feedback to the prediction and scheduling engine 230 to optimize generation of the outputs 234. For example, the machine learning module 232 may be configured to analyze historic data for pools with similar signatures to optimize the weighting of inputs 216 by the prediction and scheduling engine 230.

Referring to FIG. 4, shown therein is a flow chart of a method 400 for installing a multi-node remote pool monitoring system, according to an embodiment. The method 400 may be implemented to install the pool monitoring system 100 in FIG. 1.

At 402, at least a node is connected to a piece of pool equipment. Generally, the node is directly connected to a single piece of pool equipment but may be daisy-chained to other pool equipment via another node (see Act 404, below).

At 403, according to some embodiments, the node is connected to a sensor for monitoring the output of the piece of pool equipment connected to the node. For example, if the node is connected to a pump, the sensor may be a microphone for detecting the sound made by the pump during operation. According to some embodiments, each node includes a current measuring device/sensor to confirm the power status of the connected equipment and provide a means to confirm the up current flow signature which may inputs for machine learning analysis to predict equipment failure. Act 403 may not be performed where the node already includes a built-in sensor.

At 404, the node is connected to a master node (i.e., a main control unit) by a serial interface, whereby the node is serially connected to the master node for power and data transmission between the nodes. As the method 400 may proceed in a loop, in subsequent performance of act 404, subsequent nodes may be daisy-chained to a node already connected to the master node.

At 406, a UUID on the node is scanned to assign a unique network address to the node. The UUID is electronically embedded on an ID chip within each node. Each node includes a "network setup" button, which when pressed, causes the node to publish its UUID. The master node will scan and receive the UUID from the node, and assign a unique network address for the node associated to the UUID.

The UUID may also be printed on a sticker with a barcode, a QR code, or the like, for reference. The UUID sticker may be scanned by a user device (e.g., a smartphone having a camera) running an application configured for scanning the UUID sticker and assigning a network address to each node.

Figure 3G:
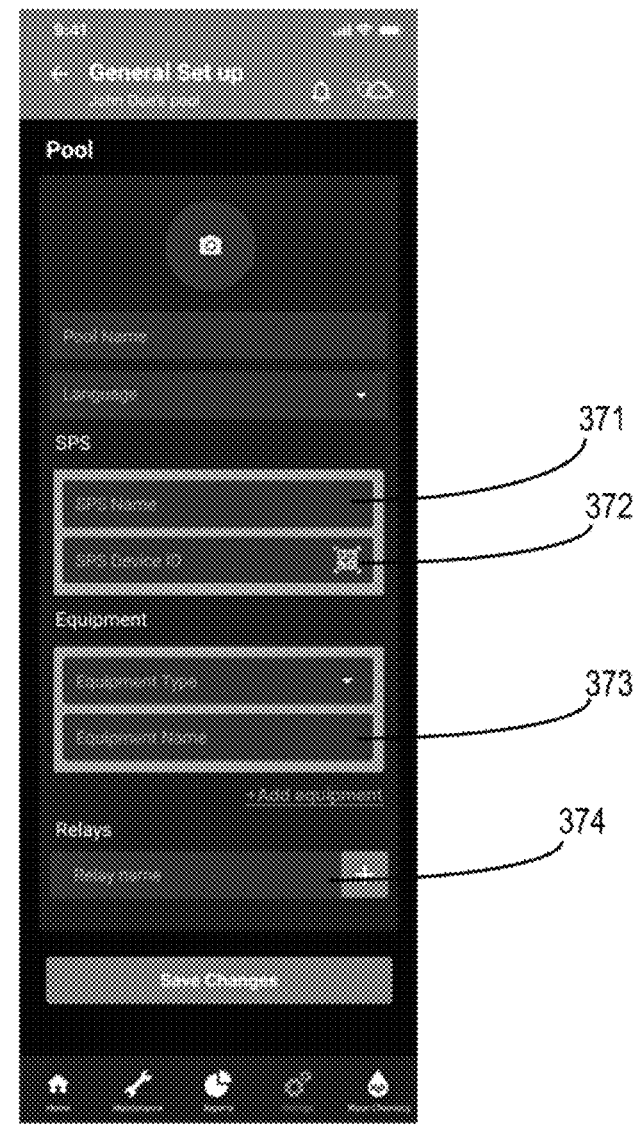
FIG. 3G is an exemplary user interface for a multi-node network setup, according to an embodiment.

Referring to FIG. 3G, shown therein is an exemplary user interface 370 on a user device showing a multi node network setup, according to an embodiment. The multi-node network setup includes at least one slave node 371 having a UUID 372 that was scanned to assign a unique network address 354. The unique network address may be automatically generated from the UUID or entered/selected by a user of the user device. The multi node network setup further includes at least one piece of equipment 373 connected to the slave node 371 and a relay number 374 identifying the position of the node in a daisy-chain. The relay number 374 may be manually entered by a user when configuring the network using the user device.

Referring back to FIG. 4, at 408, a network query table is created on the master node (i.e., the main control unit), wherein the query table records the unique network address of the node in association with its UUID that was scanned at act 406. In subsequent performance of Act 408, the query table is updated to include the unique network address and UUID of nodes subsequently added in a daisy-chain to the master node. According to an embodiment, the network query table may be synchronized to a cloud for storage.

Following Act 408, the method 400 may proceed in a loop between acts 402 to 408 to add subsequent nodes (and pieces of pool equipment) to the multi node network. Once the final node and piece of pool equipment is added, the method 400 proceeds to Act 410.

At 410, the main control unit (i.e., master node) sends a command or a query to a target node. The command or query is addressed to the target node by its unique network address. The command or query may be of one: switch a connected relay/load; report the status of the connected load; and report the signal recorded by connected sensors. The command or query may be relayed to the target node via the daisy chain of connected nodes in the multi-node network.

Figure 6:
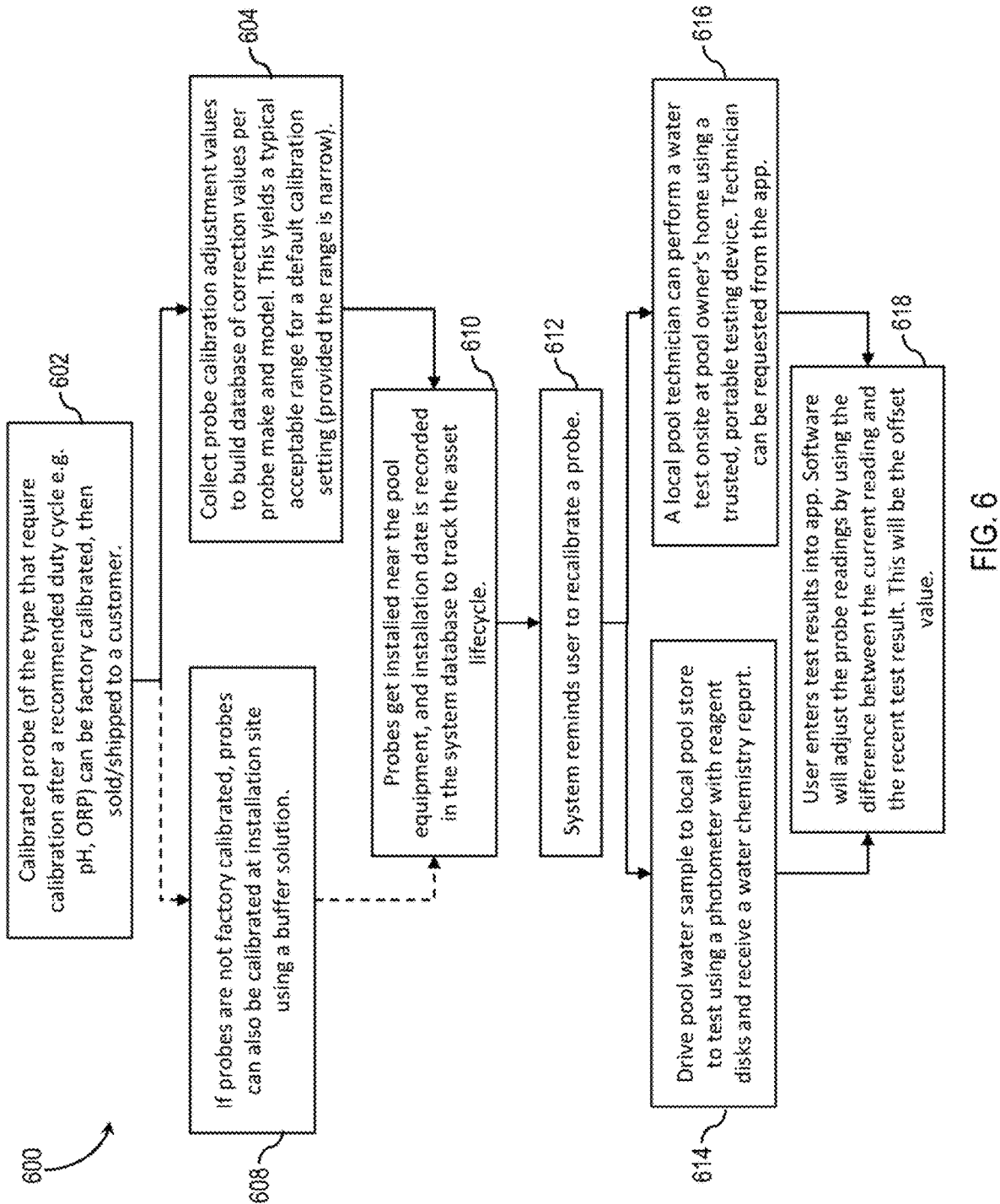
FIG. 6 is a flow chart of a method for calibrating a probe, in accordance with an embodiment.

FIG. 6 illustrates a method 600 for calibrating a probe, in accordance with an embodiment. The method 600 may calibrate sensors in a probe in the water analysis unit 127, for example as described with reference to FIG. 1.

Over time, the probes and sensors may drift and need to be calibrated. Conventionally, when probes drift, the probe is removed from the liquid it is sensing and dipped into a solution having known sensed levels. The probe is then corrected in the probe's micro-controller.

The method 600 may calibrate the probe without removing the probe from the solution it is sensing. The method 600 may be autonomous in that the method avoids removing installed probes from the system and manually calibrating using a buffer powder or a buffer solution.

Instead, the method 600 compares a pool water sample to a known, trusted, calibrated reading using an alternate probe and sensor apparatus, or similar trusted testing device. For example, periodically (e.g., at 3 months intervals) a user will take a water sample to a water testing location (e.g., a local pool store) to test the water sample. The water testing location uses, for example, a photometer with reagent disks and generates a water chemistry report based on the sample. The user then enters the test results of the water chemistry report based on the sample into their device (e.g., user device 162). The computer system (e.g., cloud 162) adjusts the probe readings by using the difference between the current reading and the recent test result, to generate an offset value.

Alternatively, or in addition, a pool technician can perform the same type of water test onsite at pool owner's home using a trusted, portable testing device to achieve the same result. Optionally, pool technicians can be requested from the user device 162 and dispatched.

The could system 162 collects probe calibration adjustment values and builds a database of correction values per probe make and model. This approach may yield a typical acceptable range for a default calibration setting provided the range is narrow.

At 602, the calibrated probe (of the type that has calibration after a recommended duty cycles (e.g., pH, Oxidation-Reduction Potential (ORP)) is factory calibrated. The calibrated probe is sold and shipped to the customer At 604, the probe calibration adjustment values are collected to build a database of correction values per probe make and model. The database includes a typical acceptable range for a default calibration setting provided the range is narrow.

At 608, optionally if the probes are not factory calibrated, the probes are calibrated at the installation site using a buffer solution.

At 610, the probes are installed near the pool equipment and the installation date is recorded in the system database to track the asset lifecycle.

At 612, the system reminds the user to recalibrate the probe.

At 614, the test result reading is generated by testing a water sample of where the probe is located (whether tested remotely at a pool store or onsite by a pool technician). The water sample may be tested using a photometer with reagent disks and a water chemistry report is generated.

At 616, alternatively, a pool technician performs water testing onsite at the pool with a trusted, portable testing device. The technician may be requested from the mobile application.

At 618, the user enters the test results into the mobile application. The software system will adjust the probe readings by any offset value generated by the difference between the current reading and the recent test results, to generate an offset value.

FIG. 7 illustrates a method 700 for probe drift compensation, in accordance with an embodiment. Once there are circa 500 units deployed, the overall system will have database of collected data points and process that data and may optionally skip the probe calibration method 600 as described with reference to FIG. 6.

The method 700 may recalibrate pH and ORP probes using software adjustment from the cloud by using collected data (minimum initial sample size required for pH and ORP probes). Factors include probe make, model, service time (based on installation date and usage). The backend cloud service adds or subtracts a value from the readings before presenting to the end user.

User collection of manual recalibration values (visit to pool store, onsite pool technician), can be recorded within SPS app user profile. These data points can be aggregated to support drift compensation adjustment values.

Pool owners can be incentivized to calibrate at regular intervals depending on probe make, model, and usage.

Build a database of probe behaviours, e.g. typical calibration adjustment values, probe drift over time compared to pool signature, water chemistry, and pool owner maintenance habits. Installation date and water test date ranges will be factored-in.

The backend of the system may analyze the percent of drift values that would be high versus low, then factor in pool signature elements such as sanitization method to find correlation with drift direction.

A Monte Carlo analysis of historical data points, with opportunities for enhancement by Machine Learning, can assist with determining drift offset values. This can be repeated each time the sample size increases by a set order of magnitude for an iterative refactoring effect, thereby improving accuracy.

At 702, a user collection of the recalibration values, including for example the offset value of FIG. 6 is collected and stored. The user data and the offset value data is aggregated to generate drift compensation adjustment values.

At 704, the pool owners may be incentivized to calibrate at regular intervals depending on probe make, model and usage.

At 706, the database of probe behaviours grows, for example by typical calibration adjustment values, probe drift over time compared to pool signature, water chemistry and pool owner maintenance habits. Installation date and water test date ranges are included in data generation.

At 708, the logic of the system considers what percentage of drive values would be high versus low. Then the system factors in pool signature elements such as sanitization methods to find correlation with drift direction.

At 710, Monte Carlo analysis style machine learning using historical data points may assist with determining drift offset values. The analysis may be repeated each time the sample size increases by a set order of magnitude for an iterative refactoring effect, thereby improving accuracy.

At 712, the system monitors the last probe calibration date against the elapsed duty cycle time.

At 714, when the conditions are met, the system achieves a probe recalibration using a software adjustment (offset) from the cloud service by using the collected data of 100 s or 1000 s+ of units. Factors include probe make, model, service time (based on installation date and usage).

At 716, the backend cloud service adds or subtracts a value from the readings before presenting to the end user in the mobile application.

As an alternate configuration, when one or more slave nodes are assembled with the master node (inside the master control unit enclosure) the communication can be through RS485 without requiring an RJ45 interface. This does not prevent or limit connectivity to external slave nodes within dongle enclosures through RJ45.

While the above description provides examples of one or more apparatus, methods, or systems, it will be appreciated that other apparatus, methods, or systems may be within the scope of the claims as interpreted by one of skill in the art.

The invention claimed is:

1. A system for monitoring and controlling a multi-node pool equipment network, comprising:
   a main control unit configured as a master node to support a serial communication protocol across a plurality of nodes; and
   a first relay node connected to the main control unit by a serial interface configured for power and data transmission between the master node and the first relay node;
   a cloud server configured to:
      implement one or more machine learning algorithms to automatically minimize the carbon footprint of the system by scheduling operation of the connected pool equipment during a low carbon phase of a local power grid;
      connect to one or more power grid API services to retrieve carbon emission rates to the local power grid and identify one or more low carbon phases of the local power grid;
   wherein the main control unit is configured to send a command or a query to the first relay node over the serial interface using the serial communication protocol; and
   wherein the first relay node is configured to:
      switch a relay or a load connected to the first relay node;
      report a status of connected pool equipment to the main control unit; and
      report a measurement of the output of the connected pool equipment to the main control unit.

2. The system of claim 1, further comprising:
   at least a second relay node serially connected to the first relay node, wherein the at least second relay node and the first relay node form a daisy-chain for power and data transmission between the master node and the at least second relay node,
   wherein the main control unit is configured to send the command or the query to the at least second relay node via the first relay node using the serial communication protocol; and
   wherein the at least second relay node is configured to:
      switch a relay or a load connected to the second relay node;
      report the status of connected pool equipment to the main control unit via the daisy-chain; and
      report the measurement of the output of the connected pool equipment to the main control unit via the daisy-chain.

3. The system of claim 1, wherein the measurement of the output of the connected pool equipment is recorded by a sensor in the first relay node wherein the sensor is one of: a current sensor, an acoustic sensor and an accelerometer/vibration sensor.

4. The system of claim 1, wherein the main control unit comprises a power injector to supply DC power to the main control unit, whereby the main control unit transmits DC power to the first relay node.

5. The system of claim 2, wherein the main control unit comprises a power injector to supply DC power to the main control unit, whereby the main control unit transmits DC power to the nodes along the daisy-chain.

6. The system of claim 1, further comprising: a sensor node serially connected to the main control unit for power and data transmission between the master node and the sensor node, wherein the sensor node comprises a plurality of sensors for measuring water chemistry.

7. The system of claim 6, wherein the plurality of sensors includes one or more of:
   a potentiometer, a redox potential sensor, an electrical conductivity sensor, a temperature sensor and a humidity sensor.

8. The system of claim 1, further comprising: a valve actuator node connected to the main control unit for power and data transmission between the master node and the valve actuator node, wherein the valve actuator node is configured to:
   adjust the position of a connected valve; and
   report the position of the connected valve to the main control unit.

9. The system of claim 3, wherein the main control unit is configured to transmit the measurement recorded by the sensor to a cloud server for storage.

10. The system of claim 2, wherein the main control unit comprises a SIM card configured for connecting the main control unit to a GSM communication network to exchange data with the cloud server.

11. The system of claim 2, wherein the cloud server is further configured to implement heartbeat signaling between the cloud server and a piece of pool equipment connected to one of the relay nodes.

* * * * *